(12) United States Patent  (10) Patent No.: US 8,808,912 B2
Thackeray et al.  (45) Date of Patent: Aug. 19, 2014

(54) SURFACE PROTECTED LITHIUM-METAL-OXIDE ELECTRODES

(75) Inventors: Michael M. Thackeray, Naperville, IL (US); Sun-Ho Kang, Naperville, IL (US)

(73) Assignee: Uchicago Argonne, LLC, Chicago, IL (US)

( * ) Notice: Subject to any disclaimer, the term of this patent is extended or adjusted under 35 U.S.C. 154(b) by 748 days.

(21) Appl. No.: 12/694,422

(22) Filed: Jan. 27, 2010

(65) Prior Publication Data

US 2010/0190058 A1 Jul. 29, 2010

Related U.S. Application Data

(60) Provisional application No. 61/148,266, filed on Jan. 29, 2009.

(51) Int. Cl.
*H01M 4/13* (2010.01)

(52) U.S. Cl.
CPC ............... *H01M 4/13* (2013.01); *Y02E 60/122* (2013.01)
USPC ........... 429/223; 429/209; 429/224; 429/229; 429/527

(58) Field of Classification Search
USPC ........................................... 429/223
See application file for complete search history.

(56) References Cited

U.S. PATENT DOCUMENTS

| | | | |
|---|---|---|---|
| 5,316,877 A | 5/1994 | Thackeray et al. | |
| 6,677,082 B2 | 1/2004 | Thackeray et al. | |
| 6,680,143 B2 | 1/2004 | Thackeray et al. | |
| 8,148,015 B2 * | 4/2012 | Pan et al. | 429/231.1 |
| 2001/0046628 A1 | 11/2001 | Oesten et al. | |
| 2006/0216605 A1 * | 9/2006 | Shirakata et al. | 429/231.95 |

OTHER PUBLICATIONS

Kim, J. et al. Controlled nanoparticle matel phosphates (metal = Al, Fe, Ce, and Sr) coatings on LiCoO2 cathode materials, 2005, Journal of the Electrochemical Society, vol. 152(6), pp. A1142-A1148.*

Yang, J. et al. Synthesis and Characterizatoin of carbon-coated lithium transition metal phosphates LiMPO4 (M = Fe, Mn, Co, Ni) prepared via a nonaqueous sol-gel route, 2006, Journal of the Electrochemical Society, vol. 153 (4), pp. A716-A723.*

Kim, J-S. et al. Electrochemical and structural properties of xLi2M'O3.(1-x)LiMn0.5Ni0.5O2 electrodes for lithium batteries (M' = Ti, Mn, Zr; 0<x<0.3), 2004, Chemical Material, vol. 16(10), pp. 1996-2006.*

J. Cho et al., Novel LiCoO2 Cathode Material with Al2O3 Coating for a Li Ion Cell, Chem. Mater., 12, 3788-3791 (2000).

J. Cho et al., High-Performance ZrO2-Coated LiNiO2 Cathode Material, Electrochemical and Solid State Letters, 4 (10) A159-A161 (2001).

(Continued)

*Primary Examiner* — Robert Xu
(74) *Attorney, Agent, or Firm* — Olson & Cepuritis, Ltd.

(57) ABSTRACT

A lithium-metal-oxide positive electrode having a layered or spinel structure for a non-aqueous lithium electrochemical cell and battery is disclosed comprising electrode particles that are protected at the surface from undesirable effects, such as electrolyte oxidation, oxygen loss or dissolution by one or more lithium-metal-polyanionic compounds, such as a lithium-metal-phosphate or a lithium-metal-silicate material that can act as a solid electrolyte at or above the operating potential of the lithium-metal-oxide electrode. The surface protection significantly enhances the surface stability, rate capability and cycling stability of the lithium-metal-oxide electrodes, particularly when charged to high potentials.

26 Claims, 11 Drawing Sheets

(a)  (b)

(56) References Cited

OTHER PUBLICATIONS

W. Choi et al., Superior Capacity Retention Spinel Oxyfluoride Cathodes for Lithium-Ion Batteries, Electrochemical and Solid State Letters, 9 (5) A245-A248 (2006).
C.S. Johnson et al., Lithium-Manganese Oxide Electrodes with Layered Spinel Composite Structures . . . Lithium Batteries, Electrochemistry Communications 7, 528-536 (2005).
Z. Chen et al., Effect of a $ZrO_2$ Coating on the Structure and Electrochemistry of $Li_xCoO_2$ When Cycled to 4.5 V, Electrochemical and Solid State Letters, 5 (10) A213-A216(2002).
G. Amatucci et al., Optimization of Insertion Compounds Such as $LiMn_2O_4$ for Li-Ion Batteries, Journal of the Electrochemical Society, 149 (12) K31-K46 (2002).
C.S. Johnson et al., The Significance of the $Li_2MnO_3$ Component in Composite $xLi_2MnO_3$ $(1-x)LiMn_{0.5}Ni_{0.5}O_2$ Electrodes, Electrochemistry Communications 6, 1085-1091 (2004).
S.H. Kang et al., The Effects of Acid Treatment on the Electrochemical Properties . . . Journal of the Electrochemical Society, 153 (6) A1186-A1192 (2006).
S.H. Kang et al., Layered $Li(Li_{0.2}Ni_{0.15+0.5z}Co_{0.10}Mn_{0.55-0.5z})O_2-zF_z$ Cathode Materials for Li-ion Secondary Batteries, Journal of Power Sources 146, 654-657 (2005).
S.H. Kang et al., Stabilization of $xLi_2MnO_3(1-x)LiMO_2$ Electrode Surfaces . . . Journal of the Electrochemical Society, 155, (4) A269-A275 (2008).
J.S. Kim et al., The Electrochemical Stability of Spinel Electrodes . . . , Journal of The Electrochemical Society, 151 (10) A1755-A1761 (2004).
J.S. Kim et al., Electrochemical and Structural Properties of $xLi_2M'O_3 \cdot (1-x) LiMn_{0.5}Ni_{0.5}O_2$ Electrodes . . . Chemical Matererials 16, 1996-2006 (2004).

G.H. Kim et al., Improvement of High-Voltage Cycling Behavior of Surface-Modified Li $[Ni_{1/3}Co_{1/3}Mn_{1/3}]O_2$ Journal of the Electrochemical Society, 152 (9) A1707-A1713 (2005).
Y. Wu et al. Surface Modification of High Capacity Layered $Li[Li_{0.2}Mn_{0.54}Ni_{0.13}Co_{0.13}]O_2$ Cathodes by $AIPO_4$, Journal of The Electrochemical Society, 155 (9) A635-641(2008).
M. Thackeray et al., Advances in Manganese Oxide Composite Electrodes for Lithium-Ion Batteries, J. Mater. Chem. 15, 2257-2267 (2005).
B.C. Park et al., Improvement of Structural and Electrochemical Properties of $AlF_3$-coated $Li[Ni_{1/3}Co_{1/3}Mn_{1/3}]O_2$, Journal of Power Sources 178, 826-831 (2008).
Y.K. Sun et al., $AlF_3$-Coating to Improve High Voltage Cycling Performance of Li $[Ni_{1/3}Co_{1/3}Mn_{1/3}]O_2$ . . . , Journal of the Electrochemical Society, 154 (3) A168-A172 (2007).
R.J. Gummow et al. Improved Capacity Retention in Rechargeable 4 V Lithium/Lithium-Manganese Oxide (Spinel) Cells, Solid State Ionics 69, 59-67 (1994).
M.M. Thackeray et al., $Li_2MnO_3$-Stabilized $LiMo_2$ (M=Mn, Ni, Co) Electrodes for Lithium-ton Batteries, J. Mater. Chem., 17, 3112-3125 (2007).
R.M. Ward et al., Olivine Composite Cathode Materials for Improved Lithium Ion Battery Performance, Journal of Undergraduate Research, vol. VI, 91-96 (2006).
M. Thackeray, The Need for New Lithium-Ion Battery Materials, 25th International Battery Seminar and Exhibit, Fort Lauderdale, FL., Mar. 1-31, 2008.
M. Thackeray et al., Integrated Electrode Structures for Lithium-Ion Batteries, International Workshop on Fundamentals of Lithium-Based Batteries, Nov. 1-28, 2008.

* cited by examiner

SURFACE PROTECTED LITHIUM-METAL-OXIDE ELECTRODES

CROSS-REFERENCE TO RELATED APPLICATIONS

This application claims the benefit of U.S. Provisional Application Ser. No. 61/148,266, filed on Jan. 29, 2009, which is incorporated herein by reference in its entirety.

STATEMENT OF GOVERNMENT INTEREST

The United States Government has rights in this invention pursuant to Contract No. W-31-109-ENG-38 between the United States Government and The University of Chicago and/or pursuant to Contract No. DE-AC02-06CH11357 between the United States Government and UChicago Argonne, LLC representing Argonne National Laboratory.

FIELD OF THE INVENTION

This invention relates to non-aqueous lithium cells and batteries. Such cells and batteries are used widely to power numerous devices, for example, portable electronic appliances and medical-, transportation-, aerospace- and defense systems.

SUMMARY OF THE INVENTION

This invention relates to positive electrodes (cathodes) for lithium cells and batteries. More specifically, the invention relates to lithium-metal-oxide electrodes, notably those having layered-type or spinel-type structures, or combinations thereof, which are composed of surface protected lithium-metal-oxide particles. The invention extends to electrodes in which the oxygen ions of the closed-packed spinel and layered structures are partially replaced by other anionic species, such as fluoride ions. A particular embodiment of this invention is that the surface of the lithium-metal-oxide electrode particles are protected by one or more lithium-metal-polyanionic materials, for example, a lithium-metal-phosphate, a lithium-metal-silicate or the like, such as a lithium-nickel phosphate or a lithium-nickel-silicate, that can act as a lithium-ion conductor at or above the operating potential of the lithium-metal-oxide positive electrode, thereby protecting the surface of the electrode from undesirable effects, such as electrolyte oxidation, oxygen loss or dissolution. Such surface protection significantly enhances the surface stability, rate capability and cycling stability of high capacity lithium-metal-oxide electrodes for lithium-ion cells and batteries, particularly when charged to high potentials.

BRIEF DESCRIPTION OF THE DRAWINGS

The invention consists of certain novel features and a combination of parts hereinafter fully described, illustrated in the accompanying drawings, it being understood that various changes in the details may be made without departing from the spirit, or sacrificing any of the advantages of the present invention.

DETAILED DESCRIPTION OF THE PREFERRED EMBODIMENTS

Figure 1:
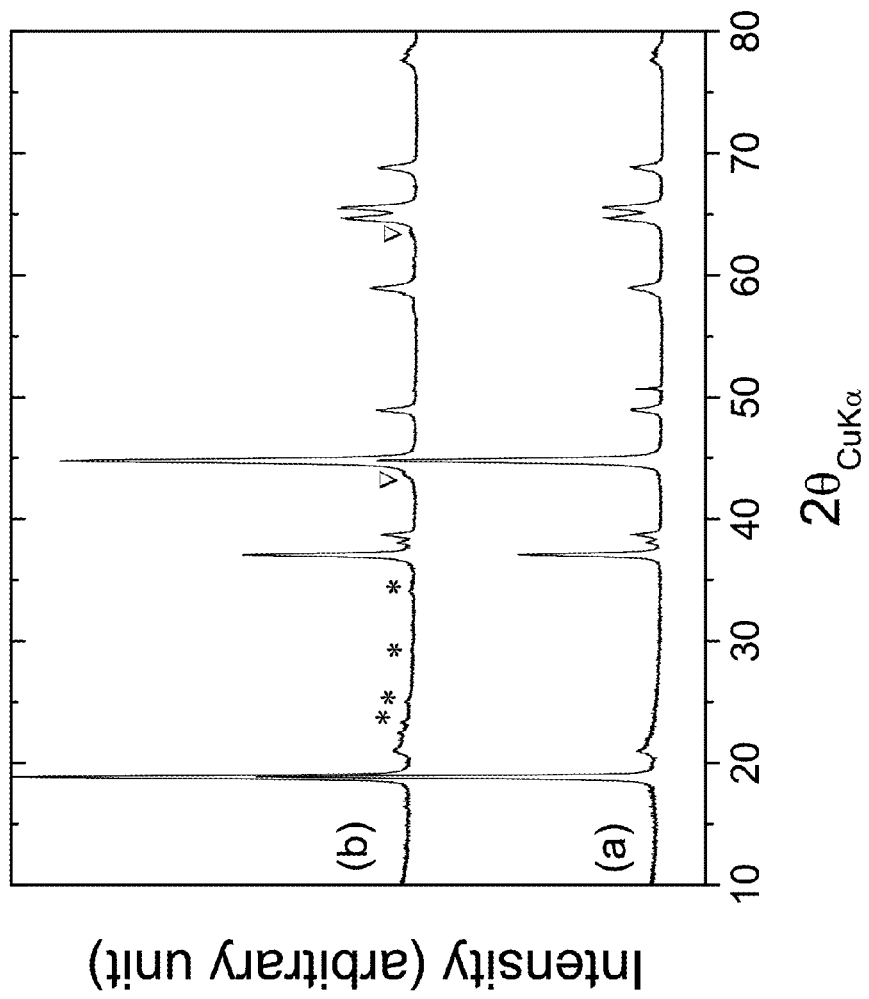
FIG. 1 depicts the powder X-ray diffraction patterns of (a) as-prepared $0.5Li_2MnO_3 \cdot 0.5LiNi_{0.44}Co_{0.25}Mn_{0.31}O_2$ and (b) a Li—Ni—$PO_4$-treated sample in which * represents peaks from $Li_3PO_4$ or a related phase, and ∇ represents an unidentified phase.

As used herein, the term "lithium-metal-oxide" and grammatical variations thereof, refers to lithium metal oxide compounds, which can optionally include lithium metal oxides in which some oxygen ions have been replaced by other anionic species, such as fluoride ions. The term "lithium-metal-polyanionic material" and grammatical variations thereof, refers to materials having a general formula that comprises at least one lithium cation, at least one other metal cation (e.g., a Ni or Co cation), and at least one polyanion (e.g., phosphate, silicate, tungstate, molybdate, etc.).

Conventional lithium-ion battery cathodes, such as layered $LiCoO_2$, spinel $LiMn_2O_4$, olivine $LiFePO_4$ and compositional variations thereof, do not deliver sufficient electrochemical capacity and power to satisfy the driving range requirements for plug-in hybrid-electric vehicles (PHEVs) and all-electric vehicles. Moreover, there is a growing demand to increase the energy and power of lithium-ion batteries for other wide-ranging applications, such as portable electronic devices, medical devices, aerospace and defense applications and for stand-alone energy storage. Conventional electrode materials such as $LiCoO_2$, $LiMn_2O_4$ and LiFePO$_4$ typically deliver capacities of 100-160 mAh/g between 4.2 and 3.0 V at moderate to high rates. Layered LiMO$_2$ compounds, in which M is selected typically from electroactive metal cations, such as Mn, Co, Ni, and additional stabilizing cations such as Li and Al, provide the best opportunity to increase the electrode capacity and hence the energy of lithium-ion cells and batteries, because they offer a maximum capacity of up to approximately 280 mAh/g at potentials greater than 3.0 V vs. metallic lithium. However, the highly oxidizing character and instability of lithium-metal-oxide electrodes, in particular, at low lithium loadings, as well as solubility effects, has limited the extent to which this high capacity can be realized, particularly at high rates.

Several efforts have already been made in the past to overcome the stability and solubility problems associated with lithium-metal-oxide electrodes. For example, considerable success has been achieved by stabilizing electrodes by pretreating the electrode powders with oxide additives such as Al$_2$O$_3$ or ZrO$_2$ obtained from metal alkoxide precursors such as solutions containing aluminum ethylhexanoate diisopropoxide (Al(OOC$_8$H$_{15}$)(OC$_3$H$_7$)$_2$) or zirconium ethylhexanoate isopropoxide (Zr[(OOC$_8$H$_{15}$)$_2$(OCH$_3$H$_7$)$_2$]) as described, for example, by J. Cho et al. in Chemistry of Materials, Volume 12, page 3788 (2000) and J. Cho et al. in Electrochemical and Solid State Letters, Volume 4 No. 10, page A159 (2001), respectively, or a zirconium oxide, polymeric precursor or zirconium oxynitrate (ZrO(NO$_3$)$_2$.xH$_2$O) as described by Z. Chen et al. in Electrochemical and Solid State Letters, Volume 5, No. 10, page A213 (2002), prior to the fabrication of the final electrode thereby making the surface of the LiCoO$_2$ particles more resistant to electrolyte attack, cobalt dissolution or oxygen loss effects. Colloidal particles have also been used to protect lithium-metal-oxide electrode surfaces, as described by Oesten et al. in US Patent Application 2001/0046628, and by Kim et al. in the Journal of the Electrochemical Society, Volume 151, page A1755 (2004). More recently, Manthiram et al. in the Journal of The Electrochemical Society, Volume 155, page A635 (2008) and Sun et al. in the Journal of The Electrochemical Society, Volume 154, page A168 (2007), and have shown that AlPO$_4$ and AlF$_3$ coatings, respectively, improve the electrochemical cycling stability of lithium-metal oxide electrodes. Despite the success of improving the performance of lithium-ion cells by coating individual electrode particles with colloidal Al$_2$O$_3$ or ZrO$_2$ particles or with AlPO$_4$, the coatings themselves either generally impede lithium diffusion in and out of the layered electrode structure during electrochemical discharge and charge, lowering the rate capability of the cells. On the other hand, although AlF$_3$ coatings reported by Sun et al., as referenced above, were shown by impedance spectroscopy to increase the rate capability of Li[Ni$_{1/3}$Co$_{1/3}$Mn$_{1/3}$]O$_2$ electrodes, when charged to 4.6 V, the capacity delivered by the electrodes was only about 160 mAh/g when discharged at a C/1 rate.

The loss of oxygen from lithium metal oxide electrodes, such as layered LiCoO$_2$ and LiNi$_{1-y}$Co$_y$O$_2$ electrodes can contribute to exothermic reactions with the electrolyte and with the lithiated carbon negative electrode, and subsequently to thermal runaway if the temperature of the cell reaches a critical value. Further improvements in the composition and structure of the surfaces of lithium-metal oxide electrodes are therefore still required to protect the intrinsic capacity of the electrode from decay and to improve the overall performance and safety of lithium-ion cells without compromising the rate capability of the electrode.

Lithium metal oxides with a spinel-type structure are particularly attractive lithium-ion battery electrodes for high-power applications. Of particular significance is the lithium-manganese-oxide spinel, LiMn$_2$O$_4$, and its cation-substituted derivatives, LiMn$_{2-x}$M$_x$O$_4$, in which M is one or more metal ions typically a monovalent or a multivalent cation such as Li$^+$, Mg$^{2+}$ and Al$^{3+}$, as reported by Gummow et al. in U.S. Pat. No. 5,316,877 and in Solid State Ionics, Volume 69, page 59 (1994). It is well known that LiMn$_2$O$_4$ and metal-substituted LiMn$_{2-x}$M$_x$O$_4$ spinel electrodes are chemically unstable in a lithium-ion cell environment, particularly at high potentials and/or when the cell operating temperature is raised above room temperature, when manganese ions from the spinel electrodes tend to dissolve in the electrolyte. This process is believed to contribute to the capacity loss of the cells at elevated temperatures. Moreover, the removal of all the lithium from LiMn$_{2-x}$M$_x$O$_4$ spinel electrodes, notably LiMn$_2$O$_4$ (x=0), yields a Mn$_{2-x}$M$_x$O$_4$ (MnO$_2$, x=0) component, which itself is a strong oxidizing agent. The surface of such delithiated spinel electrodes can have a high oxygen activity, thereby possibly inducing unwanted oxidation reactions with the electrolyte. Although considerable progress has been made to suppress the solubility and high-temperature performance of spinel electrodes and to improve their stability by cation doping, as described for example by Gummow et al. in U.S. Pat. No. 5,316,877, or by forming oxyfluoride compounds as described by Amatucci et al. in the Journal of the Electrochemical Society, Volume 149, page K31 (2002) and by Choi et al. in Electrochemical and Solid-State Letters, Volume 9, page A245-A248 (2006), or by surface coatings as described by Kim et al. in the Journal of the Electrochemical Society, Volume 151, page A1755 (2004), these treatments have not yet entirely overcome the cycling instability of cells containing manganese-based spinel electrodes.

Considerable progress has been made over recent years to stabilize cubic-close-packed layered lithium-metal-oxide electrode systems by using lithium- and manganese-rich composite electrode structures, xLi$_2$MnO$_3$.(1−x)LiMO$_2$ in which M is, for example, Mn, Ni, and/or Co, as described in U.S. Pat. Nos. 6,677,082 and 6,680,143, and by Kim et al. in Chemistry of Materials, Volume 16, page 1996 (2004), and by Thackeray et al. in the Journal of Materials Chemistry, Volume 17, page 3112 (2007). These electrodes can deliver essentially all their theoretical capacity (240-250 mAh/g) at relatively low rate, for example C/24, as reported by Johnson et al. in Electrochemistry Communications, Volume 6, page 1085 (2004). Composite electrode structures containing cubic-close-packed layered- and spinel components, such as xLi$_2$MnO$_3$.(1−x)LiMn$_{2-x}$M$_x$O$_4$ in which M is a metal cation selected preferably from Li, Ni, Co, Al and Mg have also been disclosed, as described for example, by Johnson et al. in Electrochemistry Communications, Volume 7, page 528 (2005), and by Thackeray et al. in the Journal of Materials Chemistry, Volume 15, page 2257 (2005). These composite electrodes form because of the structural compatibility of the cubic-close-packed oxygen arrays of the individual lithium-metal-oxide components. The integrated structures are highly complex and are often characterized by complicated cation arrangements with short range order.

When the manganese- and nickel ions are nearest neighbors in layered and spinel electrode structures and in the composite electrode structures described above, they tend to adopt tetravalent and divalent oxidation states, respectively. The lithium and transition metal ions are distributed in highly complex arrangements; the Li$^+$ and Mn$^{4+}$ ions are arranged in small localized regions to give the structure Li$_2$MnO$_3$-like character. Composite layered materials can be represented either in two-component notation, xLi$_2$MnO$_3$.(1−x)LiMO$_2$, in which the close-packed Li$_2$MnO$_3$ and LiMO$_2$ components are structurally integrated or, alternatively, when normalized in standard layered (rock salt) notation, as $Li_{(2+2x)/(2+x)}Mn_{2x/(2+x)}M_{(2-2x)/(2+x)}O_2$. The $Li_2MnO_3$ component that supplies surplus lithium to the layered structure plays a critical role in stabilizing the electrode structure at low lithium loadings; on lithium extraction, lithium ions in the transition metal layers diffuse into the lithium depleted layers to provide sufficient binding energy to maintain the integrity of the close-packed oxygen array.

Electrochemical extraction of lithium from $xLi_2MnO_3 \cdot (1-x)LiMO_2$ during the initial charge occurs in two steps. When taken to completion above 4.6 V vs. $Li^0$, the ideal reactions can be represented:

$$LiMO_2 \rightarrow MO_2 + Li^+ + e^- \quad (1)$$

$$Li_2MnO_3 \rightarrow MnO_2 + 2Li^+ + \tfrac{1}{2}O_2 + 2e^- \quad (2)$$

Despite the removal of lithium and oxygen from the $Li_2MnO_3$ component, the layered character of the residual $MnO_2$ component remains remarkably intact. The highly oxidizing nature of both the $MO_2$ and $MnO_2$ components, however, can result in oxygen loss at the particle surface, particularly when M=Co and/or Ni, thereby damaging the electrode surface; electrolyte oxidation can also occur at these high potentials. These factors limit the rate at which lithium can be reinserted into the charged, high-capacity $xMnO_2 \cdot (1-x)MO_2$ electrode. These electrodes also tend to lose capacity on cycling.

Attempts to stabilize cubic-close-packed layered as well as spinel lithium-metal-oxide structures by integrating them with a hexagonal-close-packed olivine structure have thus far been unsuccessful. For example, R. M. Ward et al., in the U.S. Department of Energy Journal of Undergraduate Research, Volume VI, page 91 (2006), demonstrated in their studies of reactions of $LiNiPO_4$ (olivine) and $LiNi_{0.5}Mn_{0.5}O_2$ (layered) and $Li[Ni_{0.5}Mn_{1.5}]O_4$ (spinel) precursors that the X-ray diffraction data of the products showed a complex mixture of phases, rather than structurally-integrated $LiNiPO_4$—$LiNi_{0.5}Mn_{0.5}O_2$ ('olivine-layered') and $LiNiPO_4$—$Li[Ni_{0.5}Mn_{1.5}]O_4$ (olivine-spinel) composite materials. Thackeray et al. reported at the 25$^{th}$ International Battery Seminar and Exhibit, Fort Lauderdale, Fla., Mar. 17-20, 2008 and at the International Workshop on Fundamentals of Lithium-based Batteries, Schloss Ringberg, Tegernsee, Germany, Nov. 23-28, (2008) that high resolution transmission electron diffraction of olivine $LiNiPO_4$ and spinel $LiNiVO_4$ precursors after reaction at elevated temperatures existed as discrete olivine and spinel phases, respectively, rather than as an integrated structure.

Despite the apparent inability of olivine compounds ($LiMPO_4$, M=Mn, Fe, Co, Ni) with a $PO_4^{3-}$ polyanionic framework to form integrated, epitaxially-grown structures with layered and spinel lithium metal oxides, it has now been discovered that depositing a lithium-metal-phosphate material, for example, a Li—Ni—$PO_4$ material onto the surface of a layered lithium metal oxide using a sol-gel method followed by a heat-treatment step, significantly enhances the surface stability, rate capability and cycling stability of lithium-metal-oxide electrodes, particularly when charged to high potentials, thereby allowing high capacities to be delivered at improved rates. The principles of this invention, therefore, can be extended to other types of lithium-metal-oxide structures that suffer from chemical and electrochemical instabilities at high potentials, for example, the family of lithium-manganese-oxides with a spinel-type structure, and substituted variations thereof. These advances are particularly relevant to lithium-ion batteries that power applications such as cell phones, laptop computers, power tools, hybrid-, plug-in hybrid- and all-electric vehicles for which the demand for higher energy and power batteries is growing. These new advances were first disclosed, in concept and in practical data, by Thackeray et al. at the 25$^{th}$ International Battery Seminar and Exhibit, Fort Lauderdale, Fla., Mar. 17-20, 2008 and at the International Workshop on Fundamentals of Lithium-based Batteries, Schloss Ringberg, Tegernsee, Germany, Nov. 23-28 (2008), respectively.

This invention relates to positive electrodes (cathodes) for lithium cells and batteries. More specifically, the invention relates to surface protected lithium-metal-oxide electrodes, notably those having layered-type or spinel-type structures, or combinations thereof. The invention extends to electrodes in which the oxygen ions of the closed-packed spinel and layered structures are partially replaced by and contain other anionic species, such as fluoride ions. In one embodiment, the lithium-metal-oxide electrode is comprised of a one or more layered compounds, represented by the general formula, $xLi_2M'O_3 \cdot (1-x)LiMO_2$ in which M' comprises one or more metal ions with an average tetravalent oxidation state, and M comprises one or more metal ions with an average trivalent oxidation state, as described and defined more fully by Thackeray et al. in U.S. Pat. Nos. 6,677,082 and 6,680,143. In a preferred embodiment, the M' comprises Mn, and M comprises one or more metal ions, selected preferably from Mn, Ni and Co. A second embodiment of this invention is that the surface of the lithium-metal-oxide electrode particles is protected by, and comprised of, one or more lithium-metal-polyanionic materials, such as a lithium-metal-phosphate, a lithium-metal-silicate or the like, in which the polyanion is comprised of a negatively charged species that contains more than one atom type, for example $WO_3^-$, $MoO_3^-$, $SO_4^{2-}$, $PO_4^{3-}$, $SiO_4^{4-}$. In a preferred embodiment, the negatively charged species are metal-free polyanions, such as $PO_4^{3-}$ and $SiO_4^{4-}$. In another preferred embodiment, the lithium-metal-polyanionic materials can act as lithium-ion conductors at or above the operating potential of the lithium-metal-oxide positive electrode to provide access of the lithium ions from the electrolyte to the electrode during discharge, and vice-versa during charge, while simultaneously protecting the surface of the electrode from undesirable effects, such as electrolyte oxidation, oxygen loss or dissolution. Such surface protection significantly enhances the surface stability, rate capability and cycling stability of the lithium-metal-oxide electrodes, particularly when charged to high potentials.

In another embodiment of this invention, the positive electrodes are protected by a modified surface, surface layer or coating comprising a lithium-metal-polyanionic material that is stable at and/or above the operating electrochemical potential of the lithium-metal-oxide electrode. It is desirable that the modified surface, surface layer or coating should act predominantly or exclusively as a stable lithium-ion conductor that operates preferably at or above 4 V, more preferably at or above 4.5 V and most preferably at or above 5.0 V versus metallic lithium, thereby allowing the electrode to operate repeatedly at high rates without subjecting the modified surface, surface layer or coating to potentially damaging redox reactions that might affect the electrochemical properties of the electrode. The lithium-metal-polyanionic material may be comprised of lithium, one or more metals, and one or more polyanions. In addition, the lithium-metal-polyanionic material may be amorphous or, alternatively, it may be poorly crystalline or strongly crystalline with either stoichiometric structures or cation and/or anion defect structures. Therefore in this embodiment, the positive electrode comprises lithium-metal-oxide particles, the surface of the particles comprising a lithium-metal-polyanionic material, the general formula of which comprises at least one lithium cation, at least one other metal cation, and at least one polyanion.

The lithium-metal-polyanionic material is comprised preferably of one or more lithium-metal-phosphate or lithium-metal-silicate materials, for example, those selected from the family of lithium-nickel-phosphate, lithium-cobalt-phosphate, lithium-magnesium-phosphate, lithium-nickel-silicate, lithium-cobalt-silicate, and lithium-magnesium-silicate materials. In a further preferred embodiment, the lithium-metal-polyanionic material is comprised of a lithium-nickel-phosphate, lithium-cobalt-phosphate, lithium-magnesium-phosphate, lithium-nickel-silicate, lithium-cobalt-silicate, and lithium-magnesium-silicate compositions and structures, including stoichiometric- or defect olivine-related $LiMPO_4$ structures (for example, M=Ni, Co, Mg, Zn), $Li_3PO_4$-related structures as well as metal-substituted $Li_3PO_4$-related structures, such as defect $Li_{3-x}M_{x/2}PO_4$ (for example, M=Ni, Co, Mg, Zn; 0<x<2) structures, defect $Li_{3-x}M_{x/3}PO_4$ (for example, M=Al, Ga, and La; 0<x<3) and $Li_2MSiO_4$-related structures such as stoichiometric $Li_2NiSiO_4$ and $Li_2CoSiO_4$ and defect $Li_{2-x}MSiO_4$ structures. In the stoichiometric and defect compounds of this invention, such as $LiMPO_4$, $Li_{3-x}M_{x/2}PO_4$, $Li_{3-x}M_{x/3}PO_4$, $Li_2MSiO_4$ and $Li_{2-x}MSiO_4$ compositions and structures, the M cations may be partially or completely substituted by other metal cations, for example, divalent cations, such as $Mg^{2+}$ or $Zn^{2+}$ ions, and trivalent cations, such as $Al^{3+}$ ions, and tetravalent cations, such as $Zr^{4+}$ ions, that can also form lithium-ion conducting, solid electrolyte compounds. Of particular significance is the advantage that lithium-metal-polyanionic materials containing divalent metal cations, such as $LiNiPO_4$ and $LiCoPO_4$, can remain stable and electrochemically inactive to lithium extraction to a high electrochemical potential of approximately 5 V vs. lithium metal. The applicants believe that a particular advantage of having stable divalent nickel ions in the modified surface, surface layer or coating may aid to stabilize manganese-based lithium-metal-oxide electrodes because any $Ni^{2+}$—$Mn^{4+}$ nearest neighbor interactions would contribute further to stabilizing the lithium-metal-oxide electrode surface by suppressing surface $Mn^{3+}$ species and manganese solubility.

The lithium-metal-polyanionic material of this invention may also include $Li_3PO_4$ as a component of the protective layer. In this respect, $Li_3PO_4$ may either be the major component (>50%) or the minor component (<50%) of the surface structure or, alternatively, it may be used entirely as the protective surface layer or coating of the lithium-metal-oxide electrode.

In a further embodiment, the invention is extended to include $Li_4SiO_4$-related compositions and structures and substituted compositions and structures, for example, metal-substituted, defect $Li_{4-x}M_{x/2}SiO_4$ structures in which M is one or more divalent cations such as $Ni^{2+}$, $Co^{2+}$, $Mg^{2+}$ and $Zn^{2+}$ and 0<x<2. In metal-substituted $Li_4SiO_4$ structures, the substituted M cations may alternatively be comprised of trivalent cations, such as $Al^{3+}$ ions, or tetravalent cations, such as $Zr^{4+}$ ions, that can form lithium-ion conducting compounds.

The invention includes experimental procedures and treatments for depositing the protective layers onto, or coating the lithium-metal-oxide-electrodes. Examples include, in particular, standard sol-gel, rf-magnetron sputtering and/or atomic layer deposition techniques. Because the precise nature of the modified surface, surface layer or coating is not known, the terms 'surface treatment' and 'surface coating' as disclosed in this specification are used synonymously and interchangeably.

The following examples describe the principles of the invention as contemplated by the inventors, but they are not to be construed as limiting examples.

EXAMPLE 1

A mildly fluorinated $0.5Li_2MnO_3 \cdot 0.5LiNi_{0.44}Co_{0.25}Mn_{0.31}O_2$ ($Li_{1.200}Mn_{0.524}Ni_{0.176}Co_{0.100}O_2$) electrode was prepared from a powdered precursor as described previously by Kang et al. in the Journal of the Electrochemical Society, Volume 153, page A1186 (2006). A lithium nickel phosphate protective material was applied to the electrode powder using a sol-gel method, by immersing and treating the powder in an acidic solution (pH<4) of lithium acetate, nickel nitrate and ammonium dihydrogen phosphate with glycolic acid as a chelating agent using a Li:Ni:P ratio of about 1:1:1. Nitric acid was used to control the pH of the solution to prevent precipitation. The electrode powder was stirred continuously in the solution and heated slowly to dryness. The resulting Li—Ni—$PO_4$-coated powder product was finally heated at about 550° C. for about 6 hours in air.

Powder X-ray diffraction (XRD) patterns of Li—Ni—$PO_4$-coated samples were collected on a Siemens D5000 diffractometer (CuKα) between 10 and 80° 2θ. Coin-type cells (2032, Hohsen) were constructed from the coated powder in an argon-filled glovebox (<5 ppm $O_2$ and $H_2O$). The cathode consisted of 80 wt % of the coated oxide powder, 10 wt % carbon, and 10 wt % polyvinylidene difluoride (PVDF) binder on aluminum foil. The anode was either metallic lithium or graphite (MAG-10, Hitachi with 8 wt % PVDF) on copper foil. The electrolyte was 1.2M $LiPF_6$ in a 3:7 mixture of ethylene carbonate and ethylmethyl carbonate. For the cycling experiments, cells were galvanostatically charged and discharged between 2.0 and 4.6 V (2.0 and 4.5 V for the Li-ion cells) at different currents (0.1-2.0 mA/cm$^2$) and trickle charged at 4.6 V for 3 hours. For the rate tests, lithium cells were charged to 4.6 V at 0.1 mA/cm$^2$ with a trickle charge at 4.6 V for 3 hours; cells were discharged to 2.0 V at 0.1 to 1.0 mA/cm$^2$ with three cycles at each rate. Electrochemical experiments were conducted at room temperature and duplicated to check reproducibility.

The powder X-ray diffraction patterns of the parent, mildly fluorinated $0.5Li_2MnO_3 \cdot 0.5LiNi_{0.44}Co_{0.25}Mn_{0.31}O_2$ material and the Li—Ni—$PO_4$-coated sample are shown in FIG. 1 (patterns (a) and (b), respectively). The pattern of the uncoated sample (FIG. 1, pattern (a)) is typical of layered $xLi_2MnO_3 \cdot (1-x)LiMO_2$ materials; it shows the characteristic weak ordering peaks from the $Li_2MnO_3$-type component at 21-25° 2θ. The XRD pattern of the Li—Ni—$PO_4$-coated sample (FIG. 1, pattern (b)) is essentially identical to the parent compound; it shows a minor amount of $Li_3PO_4$ and/or structurally related $Li_{3-x}Ni_{x/2}PO_4$, and a few additional weak, unidentified peaks. The detailed nature of the surface structure is currently unknown.

It is already known that fluorination improves the room temperature cycling stability of layered lithium-metal-oxide electrodes and that the fluorine component resides predominantly at the particle surface, as described for example by Kang et al. in the Journal of Power Sources, Volume 146, page 654 (2005), Park et al. in the Journal of Power Sources Volume 178, page 826 (2008), and Kim et al. in the Journal of the Electrochemical Society, Volume 152, page A1707 (2005). Surface fluorination of $0.1Li_2MnO_3 \cdot 0.9LiMn_{0.256}Ni_{0.372}Co_{0.372}O_2$ ($Li_{1.048}[Mn_{0.333}Ni_{0.333}Co_{0.333}]_{0.952}O_2$) electrodes using mildly acidic fluorinated solutions improves their rate capability as described by Kang et al. in the Journal of the Electrochemical Society, Volume 155, page A269 (2008); in this instance, at 1.0 mA/cm$^2$, which approximates a C/1 rate, the parent electrode yielded approximately 160 mAh/g, whereas the fluorinated electrode yielded 175 mAh/g.

Figure 2:
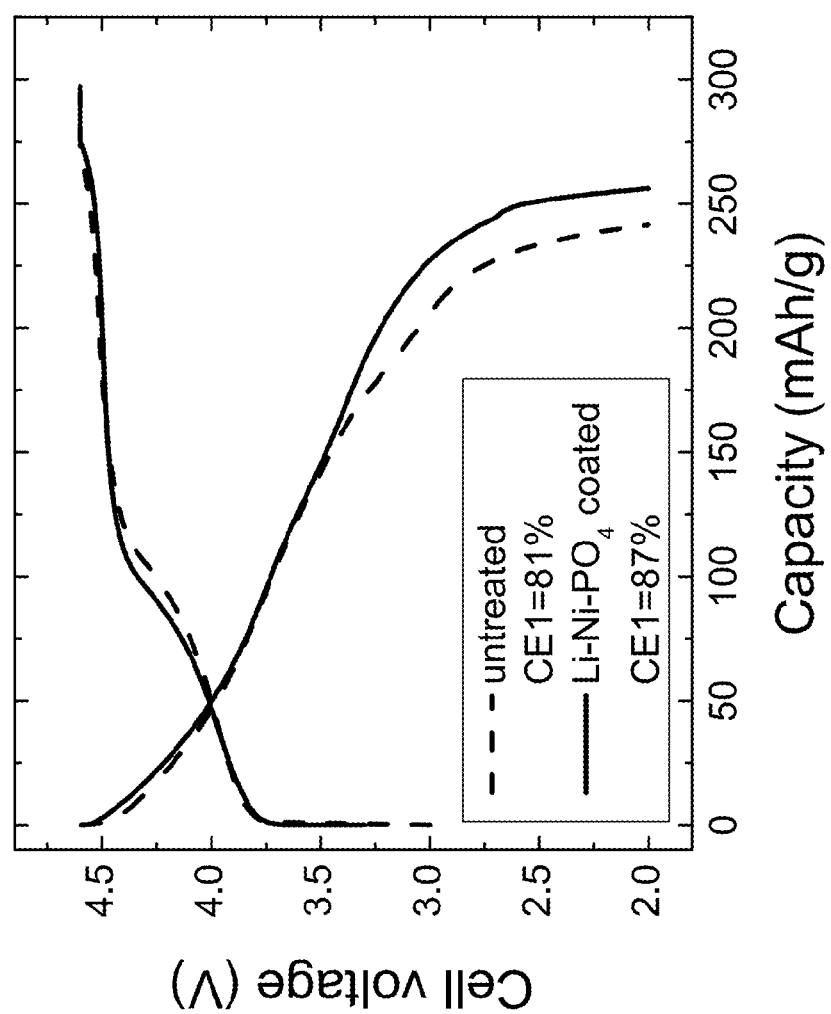
FIG. 2 depicts the initial charge and discharge profiles of lithium half cells with uncoated and Li—Ni—$PO_4$-coated $0.5Li_2MnO_3 \cdot 0.5LiNi_{0.44}Co_{0.25}Mn_{0.31}O_2$ electrodes.

The voltage profiles of the initial charge/discharge cycle of lithium half cells with the uncoated and Li—Ni—PO$_4$-coated 0.5Li$_2$MnO$_3$.0.5LiNi$_{0.44}$Co$_{0.25}$Mn$_{0.31}$O$_2$ electrodes of this invention, obtained at 0.1 mA/cm$^2$ (<C/10 rate) are shown in FIG. 2. The initial charge profiles and capacity (approximately 295 mAh/g) of the cells are similar, indicating lithium extraction first from the LiNi$_{0.44}$Co$_{0.25}$Mn$_{0.31}$O$_2$ component between 3.0 and approximately 4.4 V, followed by lithium extraction and oxygen loss (net loss Li$_2$O) between 4.4 and 4.6 V. On discharge, the Li—Ni—PO$_4$-coated electrode delivered approximately 260 mAh/g vs. the approximately 240 mAh/g from the uncoated electrode, the coated electrode exhibiting a higher, first-cycle coulombic efficiency of 87% compared to the uncoated electrode (81%). The Li—Ni—PO$_4$-coated electrodes delivered their capacity at potentials above that of the parent uncoated electrode (FIG. 2), implying that the kinetics of the electrochemical reaction was faster in the Li—Ni—PO$_4$-coated electrodes of the invention.

Figure 3:
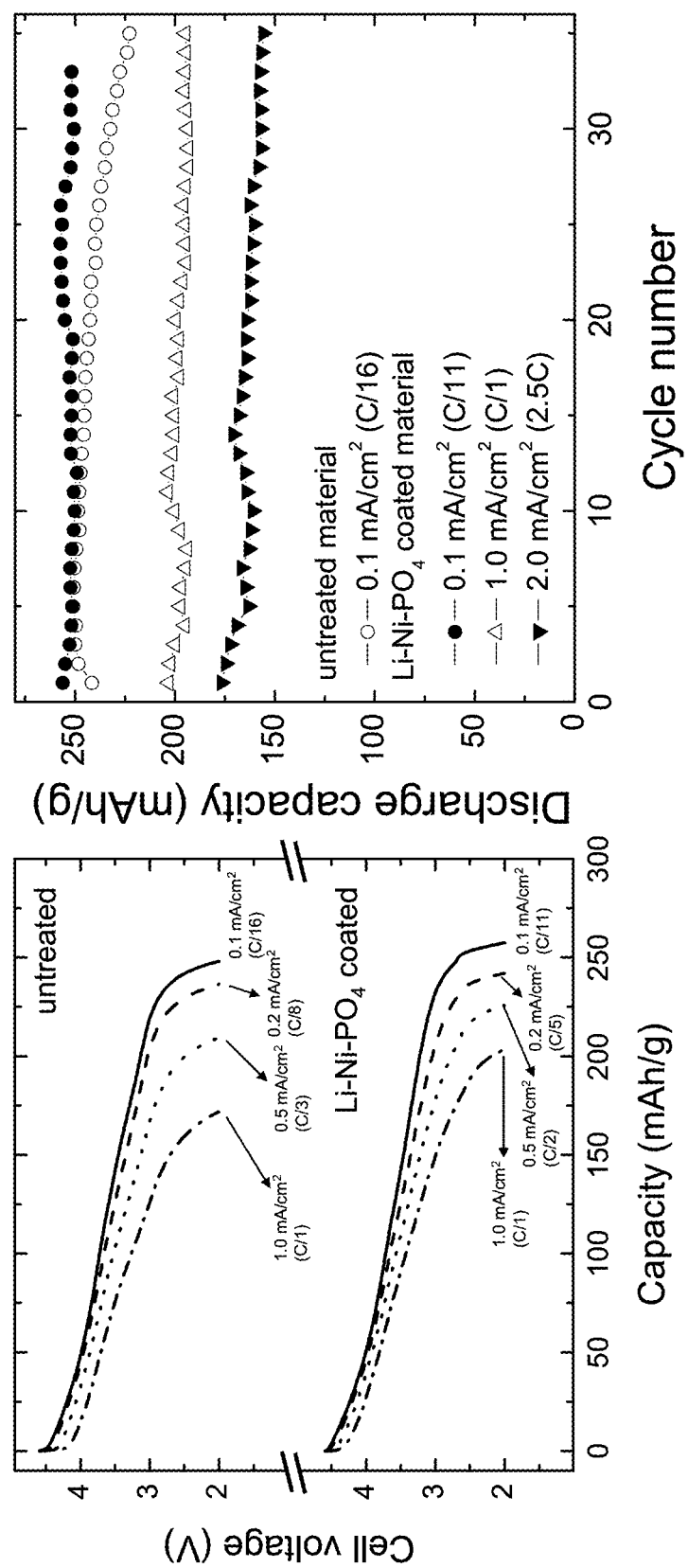
FIG. 3 depicts (a) discharge profiles of lithium half cells with uncoated and Li—Ni—$PO_4$-coated $0.5Li_2MnO_3 \cdot 0.5LiNi_{0.44}Co_{0.25}Mn_{0.31}O_2$ electrodes at various rates (charging current: $0.1$ mA/cm$^2$ for all cycles), and (b) capacity vs. cycle number between 2.0 and 4.6 V (0.1 to 2.0 mA/cm$^2$).

The relative rate capability of uncoated and Li—Ni—PO$_4$-coated electrodes is shown in FIG. 3, graph (a). The data indicate that the Li—Ni—PO$_4$-coated electrode is significantly more tolerant to higher discharge than the uncoated parent 0.5Li$_2$MnO$_3$.0.5LiNi$_{0.44}$Co$_{0.25}$Mn$_{0.31}$O$_2$ electrode and shows less polarization. The beneficial effect of the surface Li—Ni—PO$_4$ material is more pronounced at high discharge rates, the coated electrode showing a higher capacity retention at 1.0 mA/cm$^2$ (80%) relative to the capacity at 0.1 mA/cm$^2$ than the uncoated electrode (70%). The corresponding capacity vs. cycle number plots of these lithium cells, for charge/discharge currents of 0.1, 1.0 and 2.0 mA/cm$^2$, emphasize the excellent and surprisingly superior cycling stability of the coated electrodes (FIG. 3, graph (b)).

Figure 4:
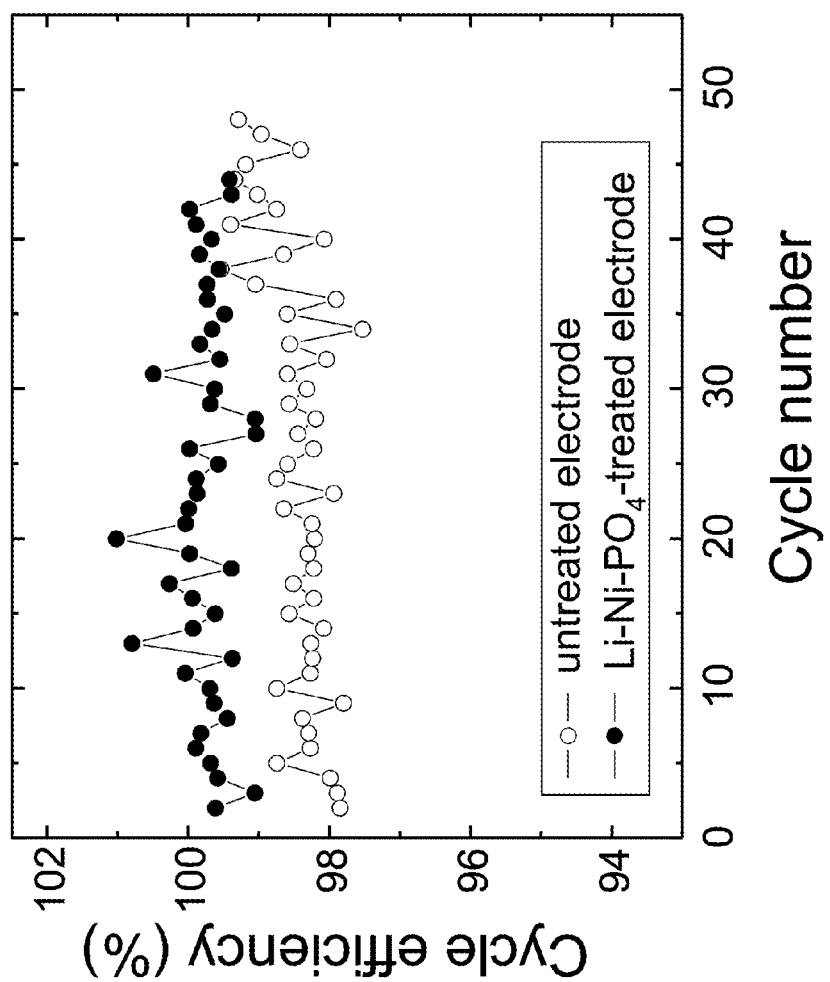
FIG. 4 depicts a plot of coulombic efficiency vs. cycle number of lithium half cells with uncoated and Li—Ni—$PO_4$-coated $0.5Li_2MnO_3 \cdot 0.5LiNi_{0.44}Co_{0.25}Mn_{0.31}O_2$ electrodes at a constant charge and discharge current rate of 0.1 mA/cm$^2$.

FIG. 4 shows a plot of coulombic efficiency vs. cycle number for lithium half cells with uncoated and Li—Ni—PO$_4$-treated 0.5Li$_2$MnO$_3$.0.5LiNi$_{0.44}$Co$_{0.25}$Mn$_{0.31}$O$_2$ electrodes (referenced ANLCC) at a constant charge and discharge current rate of 0.1 mA/cm$^2$. The data highlight the superior coulombic efficiency on repeated cycling of the treated electrodes, in accordance with the principles of this invention.

Figure 5:
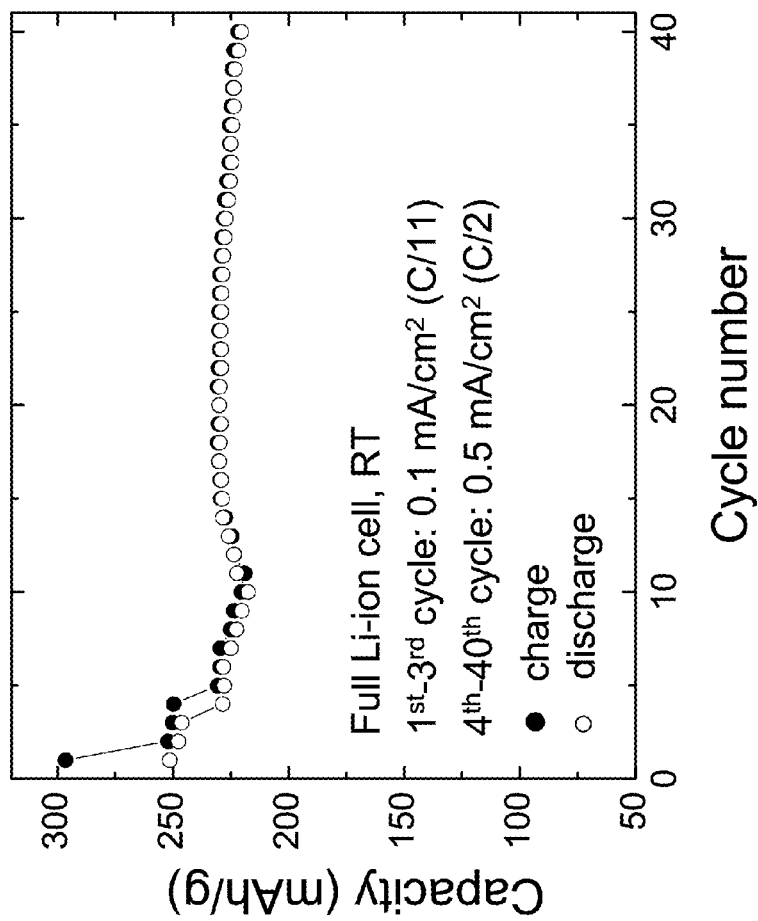
FIG. 5 depicts a plot of capacity vs. cycle number of a Li-ion cell with a Li—Ni—$PO_4$-coated $0.5Li_2MnO_3 \cdot 0.5LiNi_{0.44}Co_{0.25}Mn_{0.31}O_2$ electrode between 2.0 and 4.5 V (Cycles 1-3 at 0.1 mA/cm$^2$; cycles 3-40 at 0.5 mA/cm$^2$).
Figure 6:
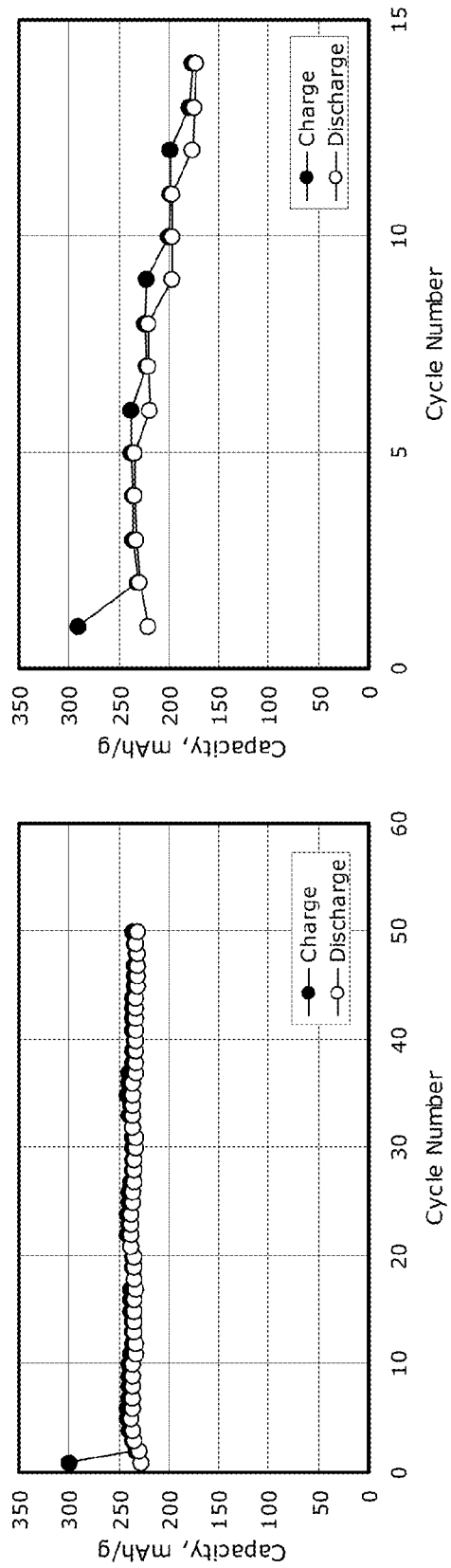
FIG. 6 depicts the electrochemical cycling performance of a lithium half cell with an uncoated $0.5Li_2MnO_3 \cdot 0.5LiNi_{0.44}Co_{0.25}Mn_{0.31}O_2$ electrode showing (a) the average coulombic efficiency of the cell over the first 50 cycles, and (b) the capacity retention at various current rates.
Figure 7:
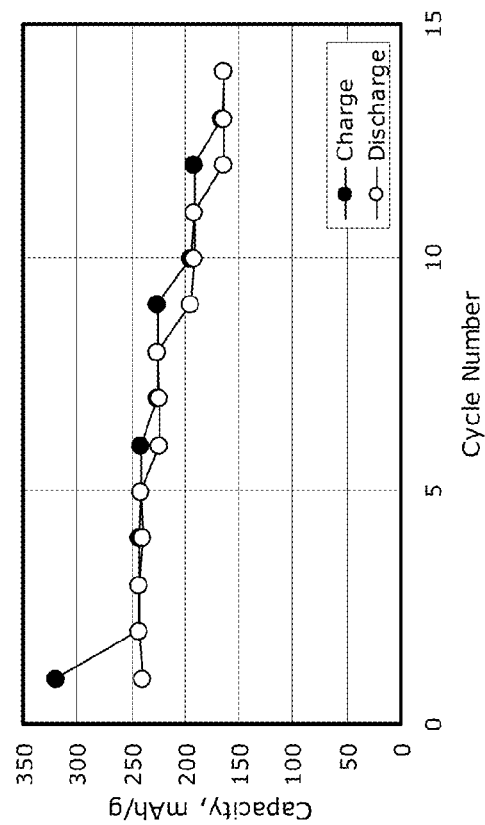
FIG. 7 depicts the electrochemical cycling performance of a lithium half cell with a $Li_3PO_4$-coated $0.5Li_2MnO_3 \cdot 0.5LiNi_{0.44}Co_{0.25}Mn_{0.31}O_2$ electrode showing (a) the average coulombic efficiency of the cell over the first 14 cycles, and (b) the capacity retention at various current rates.
Figure 7:
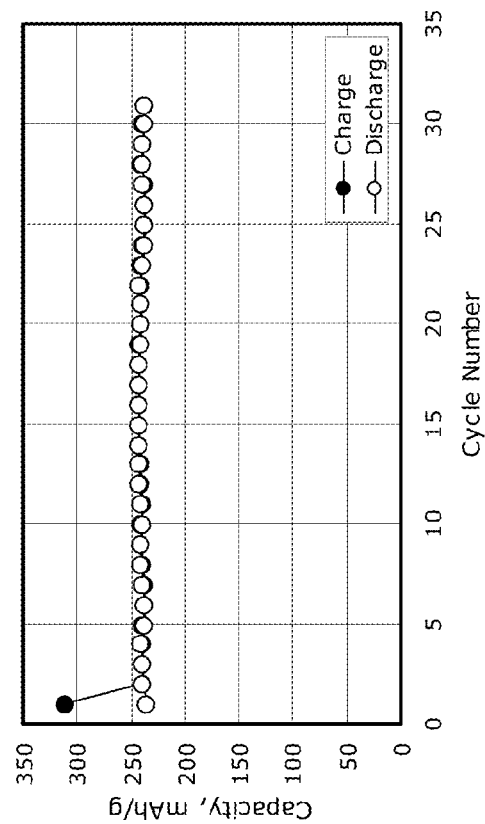
Figure 8:
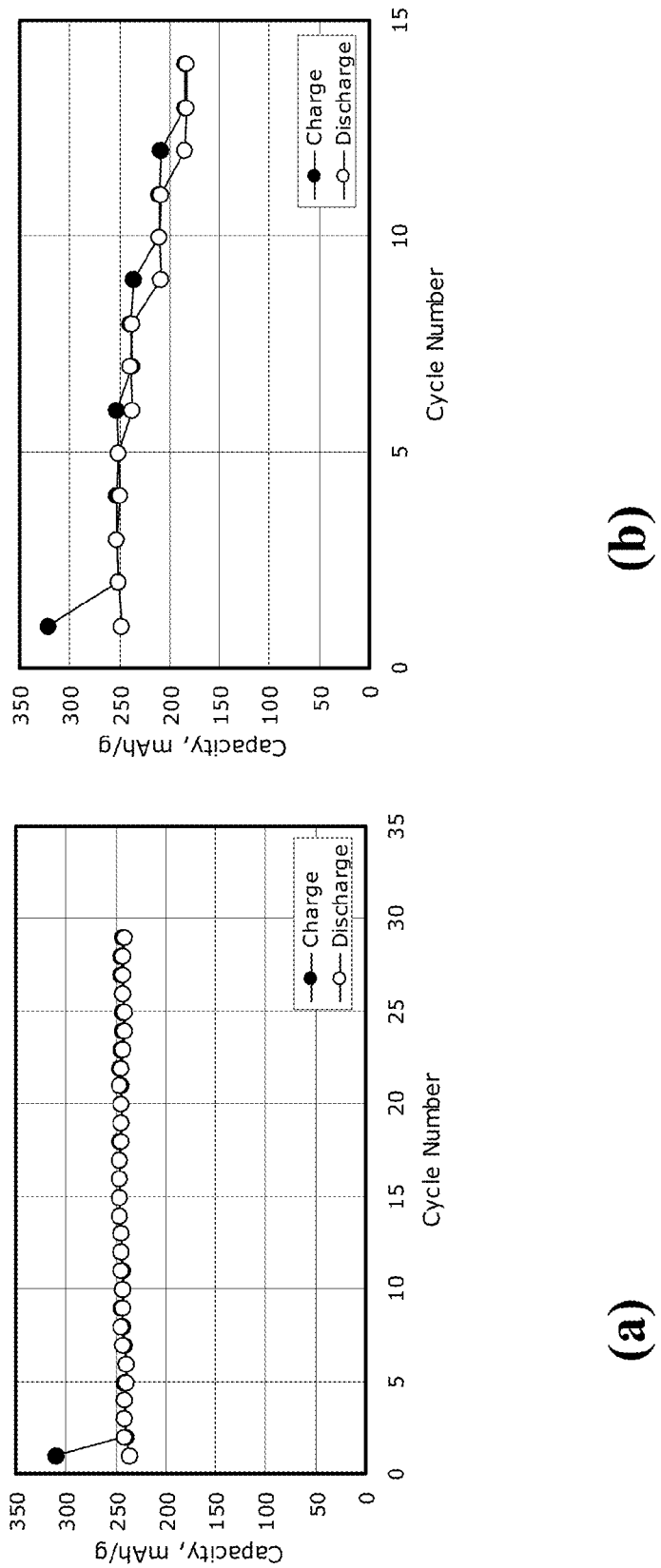
FIG. 8 depicts the electrochemical cycling performance of a lithium half cell with a $Li_{2.5}Ni_{0.25}PO_4$-coated $0.5Li_2MnO_3 \cdot 0.5LiNi_{0.44}Co_{0.25}Mn_{0.31}O_2$ electrode showing (a) the average coulombic efficiency of the cell over the first 13 cycles, and (b) the capacity retention at various current rates.
Figure 9:
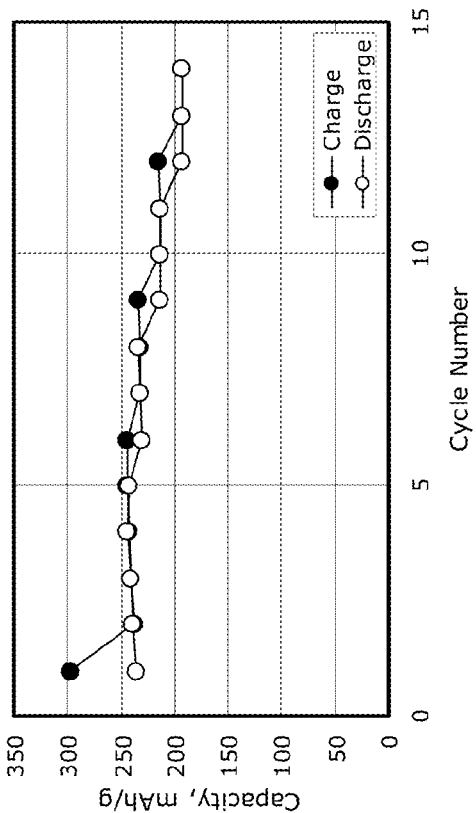
FIG. 9 depicts the electrochemical cycling performance of a lithium half cell with a $Li_{1.5}Ni_{0.75}PO_4$-coated $0.5Li_2MnO_3 \cdot 0.5LiNi_{0.44}Co_{0.25}Mn_{0.31}O_2$ electrode showing (a) the average coulombic efficiency of the cell over the first 9 cycles, and (b) the capacity retention at various current rates.
Figure 9:
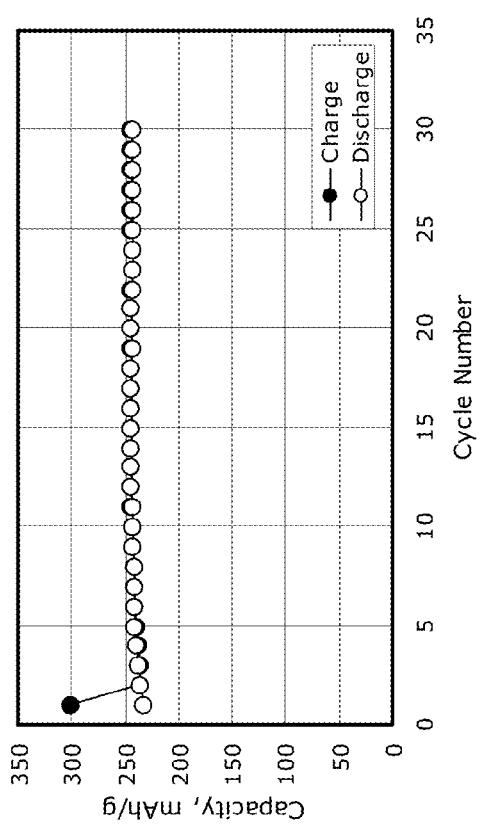

FIG. 5 shows the capacity vs. cycle number plot of a full Li-ion cell in which the cycling stability of the Li—Ni—PO$_4$-coated electrode was evaluated against a graphite anode. The cell was cycled at 0.1 mA/cm$^2$ (C/11) for the first three cycles between 4.5 and 2.0 V, and at 0.5 mA/cm$^2$ (C/2) for the following 37 cycles. The results are consistent with the half cell data in FIG. 3, graphs (a) and (b). At C/2, the treated electrode provides approximately 225 mAh/g at room temperature which, from a rate standpoint, is considerably superior to data reported by Kang et al. in the Journal of the Electrochemical Society, Volume 155, page A269 (2008) for fluorinated, but uncoated, xLi$_2$MnO$_3$.(1-x)LiMO$_2$ electrodes.

EXAMPLE 2

Coatings were applied to mildly fluorinated electrode materials 0.5Li$_2$MnO$_3$.0.5LiNi$_{0.44}$Co$_{0.25}$Mn$_{0.31}$O$_2$ (Li$_{1.200}$Mn$_{0.524}$Ni$_{0.176}$Co$_{0.100}$O$_2$) following the same treatment to the powders as described in Example 1. In these experiments, solutions containing various amounts of lithium, nickel and phosphate ions were used in accordance with the formula Li$_{3-2x}$Ni$_x$PO$_4$ for x=0, 0.25 and 0.75 such that a 2 mole percent coating was applied. In addition, an electrode sample with a coating of 2 mole percent Li$_3$PO$_4$ was also prepared, for comparison. In the final step, the resulting Li—Ni—PO$_4$-coated electrode products were dried by heating at about 550° C. for about 6 hours in air. The electrochemical properties of these electrode products were evaluated to determine, in particular, the effect that the various surface treatments or surface coatings had on coulombic efficiency and capacity, when cells were cycled at various current rates.

Electrochemical cells were assembled as described in Example 1. Representative data for the various cells with an uncoated electrode (x=0), a Li$_3$PO$_4$-coated electrode, and electrodes coated with Li$_{2.5}$Ni$_{0.25}$PO$_4$ (x=0.25) and Li$_{1.5}$Ni$_{0.75}$PO$_4$ (x=0.75) compositions are shown in FIGS. 6, 7, 8 and 9, respectively. The conditions under which the cells were cycled, for example, the operating voltage window, current rates, and average capacities at a particular current rate, are provided in Table 1. For these comparative experiments, the current rate was measured in terms of mA/g, rather than mA/cm$^2$, for greater accuracy.

FIGS. 6-9 clearly emphasize the significant improvement of the coulombic efficiency of cells with coated electrodes over those with an uncoated electrode. The uncoated electrode, while providing good electrochemical cycling stability over 50 cycles, operated, on average, with 98.7 coulombic efficiency (FIG. 6, graph (a)); it provided an average capacity of about 175 mAh/g at 150 mA/g (FIG. 6, graph (b)). The Li$_3$PO$_4$-coated electrode, provided an excellent coulombic efficiency (100.2%), but showed slightly lower capacity at a 150 mA/g rate than the uncoated electrode (FIG. 7, graphs (a) and (b)). The two Li$_{3-2x}$Ni$_x$PO$_4$-coated electrodes also provided outstanding coulombic efficiencies of 100.1 and 100.0% for x=0.25 and x=0.75 i.e., significantly higher than the uncoated electrode, respectively, thereby demonstrating the advantages of the coated electrodes of this invention. They delivered capacities of 184 and 193 mAh/g, respectively, at 150 mA/g, which is approximately a C/1 rate (FIGS. 8 and 9, graphs (a) and (b)). These results indicate that Li$_3$PO$_4$ provides the most resistive layer or coating, and that the rate capability of the Li$_{3-2x}$Ni$_x$PO$_4$ layers or coatings increases as a function of increasing Ni content, x.

TABLE 1

| Fig. # | (a) Conditions | (b) Conditions |
|---|---|---|
| 6 | Cycling conditions: Charge: 0.1 mA/cm$^2$ to 4.6 V; with 3 h trickle charge at 4.6 V; Discharge: 0.1 mA/cm$^2$ to 2.0 V; Cycling efficiency: 98.7% average (excluding the 1st cycle) | Cycling conditions: Charge: 15 mA/g to 4.6 V with 3-h trickle charge at 4.6 V; Discharge: 15 mA/g (5 cycles) to 2.0 V, 30 mA/g (3 cycles), 75 mA/g (3 cycles), 150 mA/g (3 cycles); Capacity: about 175 mAh/g at 150 mA/g |
| 7 | Cycling conditions: Charge: 0.1 mA/cm$^2$ to 4.6 V, with 3 h trickle charge at 4.6 V; Discharge: 0.1 mA/cm$^2$ to 2.0 V; Cycling efficiency: 100.0% average (excluding the 1st cycle) | Cycling conditions: Charge: 15 mA/g to 4.6 V with 3-h trickle charge at 4.6 V, Discharge: 15 mA/g (5 cycles) to 2.0 V, 30 mA/g (3 cycles), 75 mA/g (3 cycles), 150 mA/g (3 cycles); Capacity: about 164 mAh/g at 150 mA/g |

TABLE 1-continued

| Fig. # | (a) Conditions | (b) Conditions |
|---|---|---|
| 8 | Cycling conditions: Charge: 0.1 mA/cm$^2$ to 4.6 V, with 3 h trickle charge at 4.6 V, Discharge: 0.1 mA/cm$^2$ to 2.0 V; Cycling efficiency: 99.9% average (excluding the 1st cycle) | Cycling conditions: Charge: 15 mA/g to 4.6 V with 3-h trickle charge at 4.6 V, Discharge: 15 mA/g (5 cycles) to 2.0 V, 30 mA/g (3 cycles), 75 mA/g (3 cycles), 150 mA/g (3 cycles); Capacity: about 184 mAh/g at 150 mA/g |
| 9 | Cycling conditions: Charge: 0.1 mA/cm$^2$ to 4.6 V, with 3-h trickle charge at 4.6 V, Discharge: 0.1 mA/cm$^2$ to 2.0 V; Cycling efficiency: 100.0% average (excluding the 1st cycle) | Cycling conditions: Charge: 15 mA/g to 4.6 V with 3-h trickle charge at 4.6 V, Discharge: 15 mA/g (5 cycles) to 2.0 V, 30 mA/g (3 cycles), 75 mA/g (3 cycles), 150 mA/g (3 cycles); Capacity: 193 mAh/g at 150 mA/g |

Figure 10:
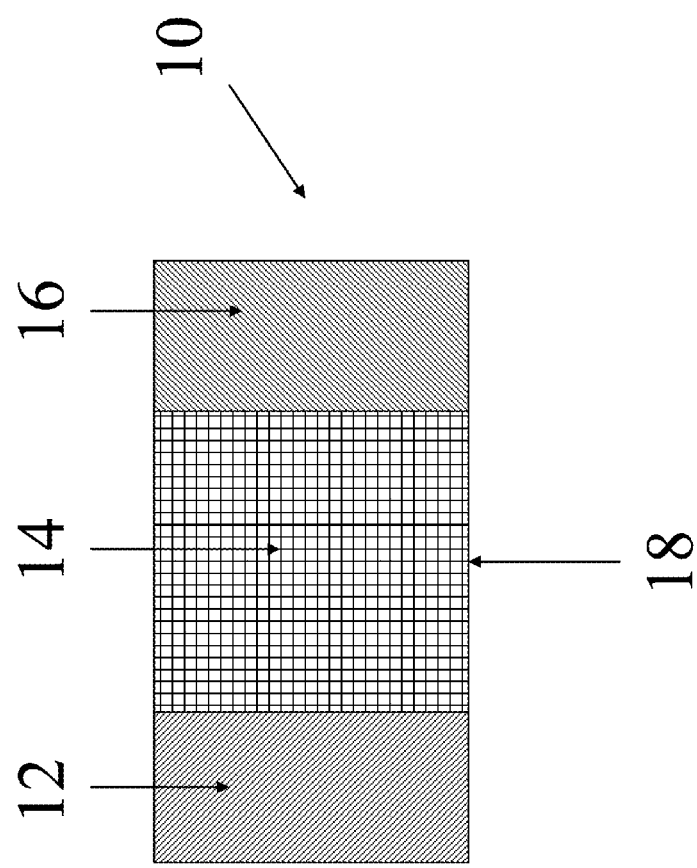
FIG. 10 depicts a schematic representation of an electrochemical cell.
Figure 11:
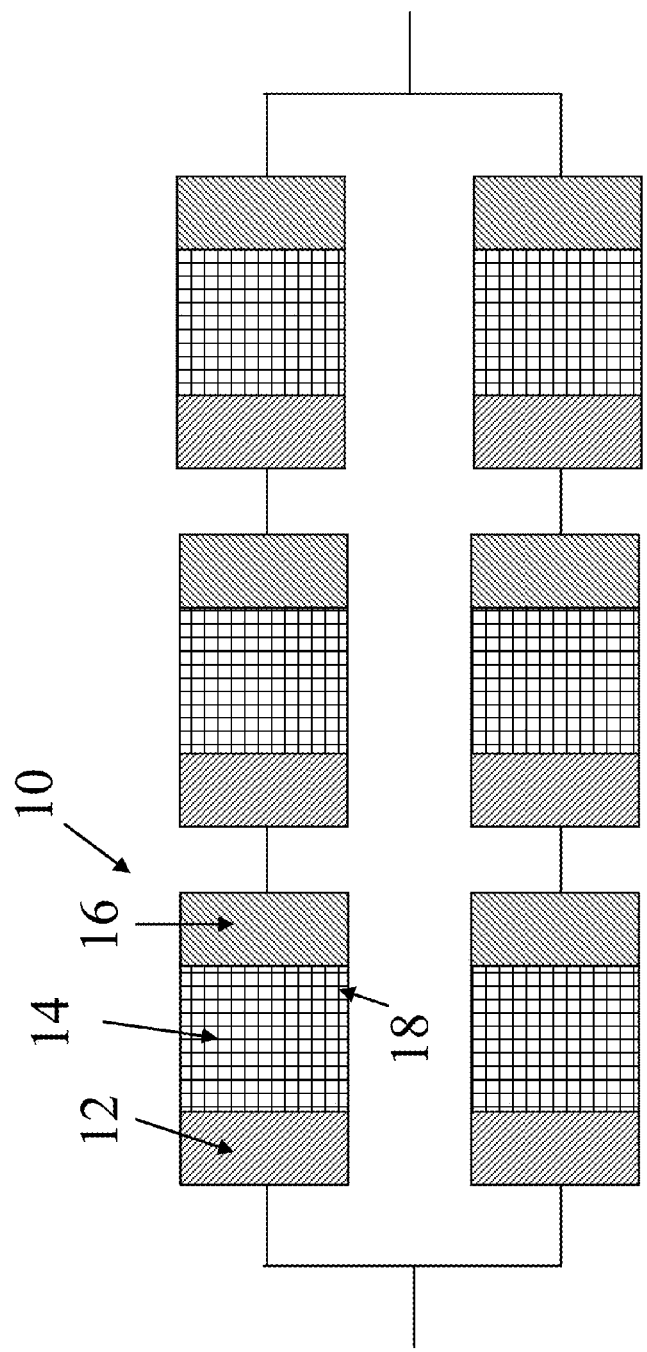
FIG. 11 depicts a schematic representation of a battery consisting of a plurality of cells connected electrically in series and in parallel.

This invention, therefore, relates to surface-protected lithium-metal-oxides that can be used as positive electrodes for a non-aqueous electrochemical lithium cell as shown schematically in FIG. 10, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 11 shows a schematic illustration of one example of a battery in which two strings of electrochemical lithium cells, described above, are arranged in parallel, each string comprising three cells arranged in series.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A positive electrode for a non-aqueous lithium cell consisting of sol-gel coated lithium-metal-oxide particles, carbon, and a binder, the surface of the coated lithium-metal-oxide particles comprising a coating consisting of a lithium-metal-polyanionic material, wherein the general formula of the lithium-metal-polyanionic material consists of at least one lithium cation, at least one other metal cation, and at least one polyanion; the lithium-metal-polyanionic material is coated onto the surface of the lithium-metal-oxide particles from an acidic sol-gel solution; and wherein the lithium-metal-oxide particles comprise a composite oxide material comprising a $Li_2MnO_3$ component.

2. The electrode of claim 1, wherein the lithium-metal-oxide particles comprise a spinel-type structure, a layered-type structure, or a combination thereof.

3. The electrode of claim 1, in which the lithium-metal-oxide particles comprise one or more compounds represented by a general formula selected from $xLi_2M'O_3 \cdot (1-x)LiMO_2$ and $xLi_2MnO_3 \cdot (1-x)LiMn_{2-x}M_xO_4$; in which M' comprises one or more metal ions with an average tetravalent oxidation state, and M comprises one or more metal ions with an average trivalent oxidation state.

4. The electrode of claim 3, in which M' comprises Mn, and M comprises one or more of Mn, Ni and Co.

5. The electrode of claim 1, wherein the lithium-metal-oxide particles contain fluoride ions.

6. The electrode of claim 1, wherein the lithium-metal-polyanionic material is a lithium-ion conductor that operates at or above 4 V versus metallic lithium.

7. The electrode of claim 6, wherein the lithium-metal-polyanionic material is a lithium-ion conductor that operates at or above 4.5 V versus metallic lithium.

8. The electrode of claim 7, wherein the lithium-metal-polyanionic material is a lithium-ion conductor that operates at or above 5.0 V versus metallic lithium.

9. The electrode of claim 1, wherein the lithium-metal-polyanionic material comprises one or more lithium-metal-phosphate or lithium-metal-silicate materials.

10. The electrode of claim 9, wherein the lithium-metal-polyanionic material consists of one or more material selected from the group consisting of a lithium-nickel-phosphate, a lithium-cobalt-phosphate, a lithium-magnesium-phosphate, a lithium-nickel-silicate, a lithium-cobalt-silicate, and a lithium-magnesium-silicate.

11. The electrode of claim 1, wherein the lithium-metal-polyanionic material is amorphous or poorly crystalline.

12. The electrode of claim 1, wherein the lithium-metal-polyanionic material comprises a stoichiometric structure, a cation-deficient structure, an anion-deficient structure, or a combination of two or more of the foregoing structures.

13. The electrode of claim 12, wherein the lithium-metal-polyanionic material comprises an olivine-type structure.

14. The electrode of claim 12, wherein the lithium-metal-polyanionic material comprises a $Li_3PO_4$-type structure.

15. The electrode of claim 12, wherein the lithium-metal-polyanionic material comprises a metal-substituted $Li_3PO_4$-type structure.

16. The electrode of claim 15 in which the metal substituent is selected from a divalent, trivalent or tetravalent ion.

17. The electrode of claim 16, wherein the lithium-metal-polyanionic material comprises a $Li_{3-x}M_{x/2}PO_4$-type structure in which M is one or more of divalent Ni, Co, Mg and Zn, and $0<x<2$.

18. The electrode of claim 16, wherein the lithium-metal-polyanionic material comprises a $Li_{3-x}M_{x/3}PO_4$-type structure in which M is one or more of trivalent Al, Ga and La, and $0<x<3$.

19. The electrode of claim 12, wherein the lithium-metal-polyanionic material comprises a $Li_2MSiO_4$-type structure in which M is a metal ion.

20. The electrode of claim 19, wherein M is one or more of Ni, Co, Mg and Zn.

21. The electrode of claim 12, wherein the lithium-metal-polyanionic material comprises a $Li_4SiO_4$-type structure.

22. The electrode of claim 12, wherein the lithium-metal-polyanionic material comprises a metal-substituted $Li_4SiO_4$-type structure.

23. The electrode of claim 22 in which the metal substituent is selected from a divalent, trivalent or tetravalent ion.

24. The electrode of claim 23, wherein the lithium-metal-polyanionic material comprises a $Li_{4-x}M_{x/2}SiO_4$ structures in which M is one or more of Ni, Co, Mg and Zn and $0<x<2$.

25. An electrochemical cell comprising the electrode of claim 1, a negative electrode, and an electrolyte therebetween.

26. A battery comprising a plurality of electrochemical cells of claim 25 arranged in parallel, in series, or both.

* * * * *